United States Patent
Wetzel

(10) Patent No.: US 6,658,830 B2
(45) Date of Patent: Dec. 9, 2003

(54) SELF-PROPELLED FLAIL MOWER AND VACUUM

(76) Inventor: William Norman Wetzel, P.O. Box 70746, Bakersfield, CA (US) 93387

( * ) Notice: Subject to any disclaimer, the term of this patent is extended or adjusted under 35 U.S.C. 154(b) by 0 days.

(21) Appl. No.: 09/970,067

(22) Filed: Oct. 2, 2001

(65) Prior Publication Data
US 2003/0061793 A1 Apr. 3, 2003

(51) Int. Cl.⁷ .............................................. A01D 34/535
(52) U.S. Cl. ......................................... 56/12.9; 56/249
(58) Field of Search ................................ 56/12.8, 12.9, 56/156, 249, 251, 252, 294, DIG. 8

(56) References Cited

U.S. PATENT DOCUMENTS

| | | | |
|---|---|---|---|
| 3,624,697 A | * | 11/1971 | Fuller .......................... 56/16.6 |
| 3,744,653 A | | 7/1973 | Jensen |
| 3,903,565 A | | 9/1975 | Hicks |
| 3,969,876 A | | 7/1976 | Turos |
| 3,999,316 A | | 12/1976 | Palmer |
| 4,095,398 A | | 6/1978 | Aumann |
| 4,104,852 A | | 8/1978 | Tackett |
| 4,359,100 A | | 11/1982 | Weichel |
| 4,741,148 A | | 5/1988 | Ekas |
| 4,881,362 A | | 11/1989 | Parker |
| 5,218,737 A | | 6/1993 | Dansby |
| 5,307,613 A | | 5/1994 | Delery |
| 5,542,243 A | | 8/1996 | Yuki |
| 5,685,134 A | | 11/1997 | Thornburg |
| 5,873,226 A | | 2/1999 | McLeod |
| 6,052,973 A | * | 4/2000 | Tsuchihashi et al. ............. 56/7 |

FOREIGN PATENT DOCUMENTS

| | | | |
|---|---|---|---|
| DE | 4314081 A1 | * 11/1994 | .................. 56/229 |
| EP | 63259 A1 | * 10/1982 | ..................... 56/1 |

* cited by examiner

Primary Examiner—Robert E. Pezzuto
Assistant Examiner—Meredith Petravick
(74) Attorney, Agent, or Firm—James M. Duncan

(57) ABSTRACT

A self-propelled mower and vacuum has a front-mounted flail blade mower assembly. After being cut, the grass clippings are propelled through a discharge chute into a cuttings basket by air pressure created by the flail blades and vanes attached to the blade rotor. Additional suction may be provided by a blower system which blows air into the discharge chute. The width of the flale blade mower assembly and the large volume of cuttings which may be held in the cuttings basket make the disclosed device particularly beneficial for mowing large areas of grass and turf, including athletic fields, belt ways and airstrips.

3 Claims, 6 Drawing Sheets

SELF-PROPELLED FLAIL MOWER AND VACUUM

BACKGROUND OF THE INVENTION

The present invention generally relates to devices used for mowing lawns and turf. The invention more particularly relates to devices which are capable of mowing large areas of turf, such as athletic fields, air strips, beltways, etc., and which are also capable of picking up cuttings while mowing.

A number of different devices are known for mowing lawns and turf. These devices fall into various general categories, including a category according to the type of blade used by the device. There are three general types of blade, those types being reel, rotary and flail. Each of these blade types has a variety of advantages and disadvantages according to the particular application. Large areas of turf, generally used for athletic fields, turf farms, air strips, beltways, parks, etc., are mowed most efficiently if the mowing device has a large cutting width which reduces the amount of time and/or manpower required for mowing. Many of the devices used for mowing large areas of turf are towed behind a tractor with a three-point hitch. Other cutting devices used for large turf areas have blade assemblies, usually rotary blades, which are an integral part of a self-propelled vehicle.

Included among the towed types of mowing devices are flail blade machines, including those manufactured or distributed by Verismo, Tri-Corp and Alamo. Flail blade machines utilize a large number of individual knives which are mounted in overlapping rows to a cutter shaft or rotor. Flail blade machines may be constructed to have a large cutting width, making the devices appropriate for large turfed areas.

The grass clippings, cuttings and other debris produced by mowing must be removed if the lawn or turf is to be both visually pleasing and healthy. If cut grass is not removed, a heavy thatch will accumulate on the lawn, which will smother new grass growth, provide a nesting place for destructive insects, and can provide an environment which encourages the rapid growth of mold, fungus and other lawn diseases. For large areas of lawn or turf, which are usually mowed with tractor-type lawnmowers, manually raking the lawn after it has been mowed is obviously not a satisfactory method for removing grass cuttings. Although rake attachments are available for tractor-type lawnmowers, this method requires additional manpower and equipment usage because it requires the tractor to make another pass after mowing. Therefore, a device is desirable which is capable of efficiently mowing large areas of grass and turf while simultaneously removing the cuttings.

Devices which continuously remove grass cuttings while the turf is being mowed with a tractor-type lawnmower are well known, including vacuuming devices, such as the devices disclosed in U.S. Pat. No. 4,095,398 and U.S. Pat. No. 4,104,852. The vacuuming components of the devices disclosed within these patents consist primarily of a container mounted on the rear of the tractor-type lawnmower, a blower powered by the engine of the lawnmower, and a duct system for conveying cut grass from a side discharge opening in the cutting deck of the lawnmower to the refuse container. The lawnmowers of these patents are rotary blade-type machines.

The device disclosed in U.S. Pat. No. 3,969,876 is a tractor-type lawnmower used in combination with an apparatus for continuously removing cut grass while the lawn is being mowed. A duct system conveys cut grass from a rearwardly projecting discharge opening in one side of the cutting deck to a refuse container mounted on the rear of the lawnmower. This device does not have a blower or other air pressure source to assist in conveying the cut grass through the duct system. The only source of air pressure for transporting grass cuttings through the duct system is the air movement created by the rotation of the rotary blade in the housing of the cutting deck.

The mower-vacuum devices discussed above, being rotary blade machines, have a limited cutting width which limits the efficiency of the machines for use in mowing large areas of turf. A flail blade machine does not have the same width limitations as a rotary machine and may be designed to have a larger cutting width. However, cuttings from a flail blade machine are not usually collected by the machine, but are either left on the ground or must be collected by a vacuuming device or by raking.

Another limitation of the rotary blade machines described above, and for most of the known flail blade machines, is that the cutting blades are located behind the front wheels of the tractor or drive vehicle. There are several advantages of having the blades of the mower mounted in front of the drive vehicle. Having the blades in front of the front wheels of the vehicle allows greater visibility for the operator to observe the mowing operation. A front-mounted blade allows provides a better cut because the blade encounters the turf before the wheels or other part of the drive vehicle which will otherwise flatten the turf. A flail mower having the mowing assembly mounted in front of the drive vehicle is disclosed in U.S. Pat. No. 5,666,794. However, the device disclosed in that patent does not have any mechanism for vacuuming or otherwise removing the clippings.

A device is desirable which provides a front-mounted flail blade assembly combined with a system which simultaneously removes the grass or turf cuttings.

SUMMARY OF THE INVENTION

The present invention is directed to a self-propelled flail mower and vacuum which meets the needs identified above. The self-propelled flail mower and vacuum comprises a drive vehicle having a frame, an operator compartment supported by the frame, an engine, a flail mower housing, a flail rotor assembly, coupling means connecting the engine to the flail rotor assembly, and a discharge chute for transferring cuttings from the flail mower housing to a cuttings basket attached to the drive vehicle. The self-propelled drive vehicle has a front and a back and wheels operably attached to the vehicle. The flail mower housing is pivotally attached to the front of the drive vehicle. The flail rotor assembly is mounted within the flail mower housing, supported by bearings. The flail rotor assembly comprises a rotor, a plurality of vanes attached to the rotor, and a plurality of flail blades pivotally attached to the rotor. The discharge chute has an intake end and a discharge end, with the intake end connected to the flail mower housing and the discharge end connected to the cuttings basket. The vanes provide positive pressure into the discharge chute, propelling cuttings from the flail mower housing into the discharge chute and out the discharge end into the cuttings basket.

A blower may be connected with duct works to the discharge chute, with the duct works terminating with a nozzle. The discharge chute may an air boost inlet located between the intake end and the discharge end adapted to receive the nozzle. A venturi is formed within the nozzle creating a vacuum for assisting cuttings through the discharge chute into the cuttings basket. Power means, such as belt drive off the engine, provide the means for powering the blower.

The cuttings basket may be pivotally attached to the frame of the drive vehicle. A hydraulic ram may be attached at one end to the frame and the other end attached to the cuttings basket, so that the cutting basket may be pivoted and emptied by operation of the hydraulic ram. Likewise, a hydraulic ram may extend from the flail mower housing to the drive vehicle, so that the flail mower housing may be raised or lowered by operation of the hydraulic ram.

The engine may be used to drive hydraulic pumps, the hydraulic pumps providing power fluid for operating the wheels. The hydraulic pumps may also provide power fluid for the hydraulic rams used for pivoting the cuttings basket and the flail mower housing.

These and other features, aspects, and advantages of the present invention will become better understood with regard to the following description, appended claims, and accompanying drawings.

DETAILED DESCRIPTION OF THE EMBODIMENTS

Figure 1:
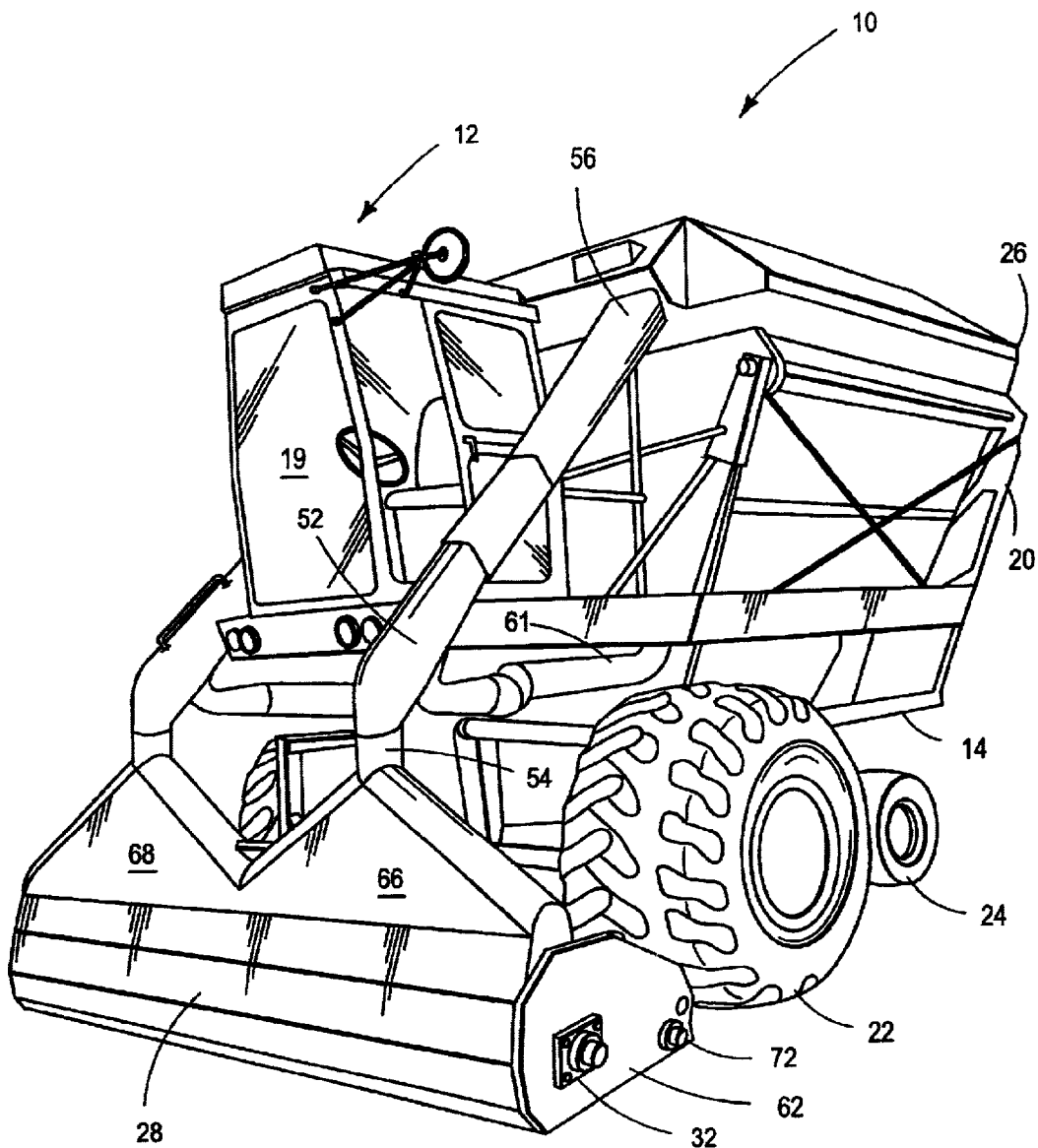
FIG. 1 is an isometric view of the disclosed self-propelled flail mower and vacuum from the right front.
Figure 4:
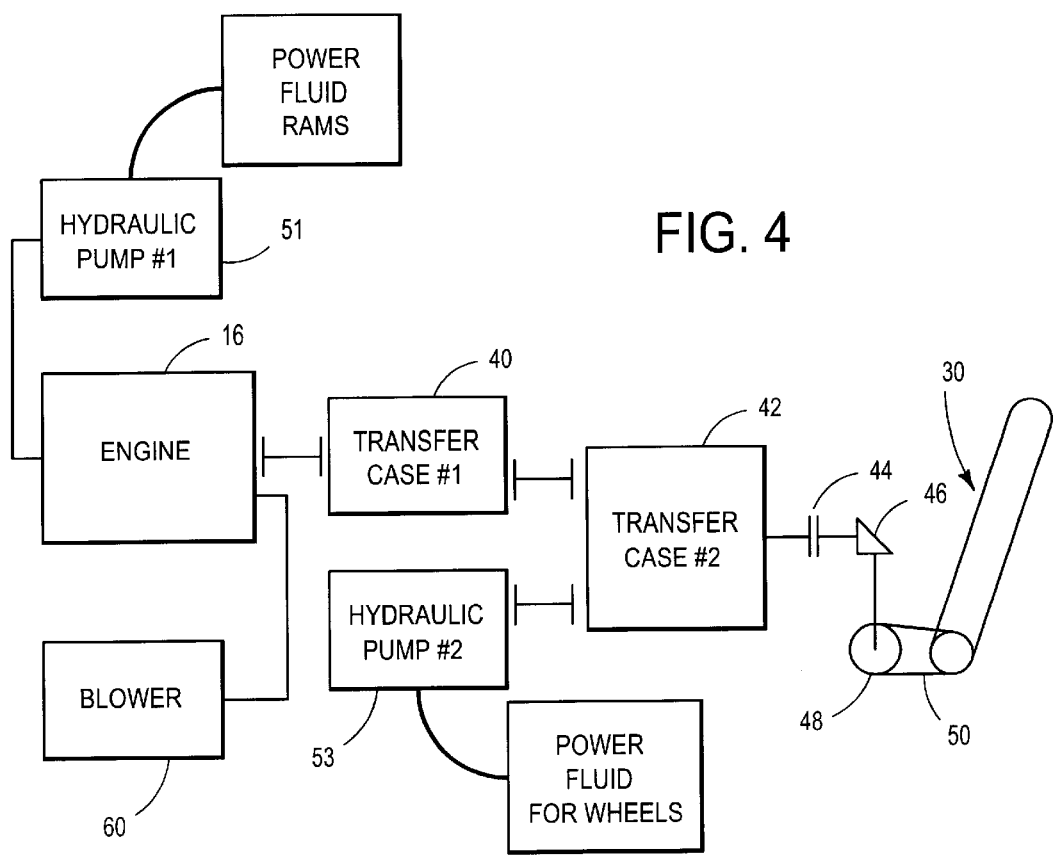
FIG. 4 is a schematic showing the drive train of the disclosed device.
Figure 5:
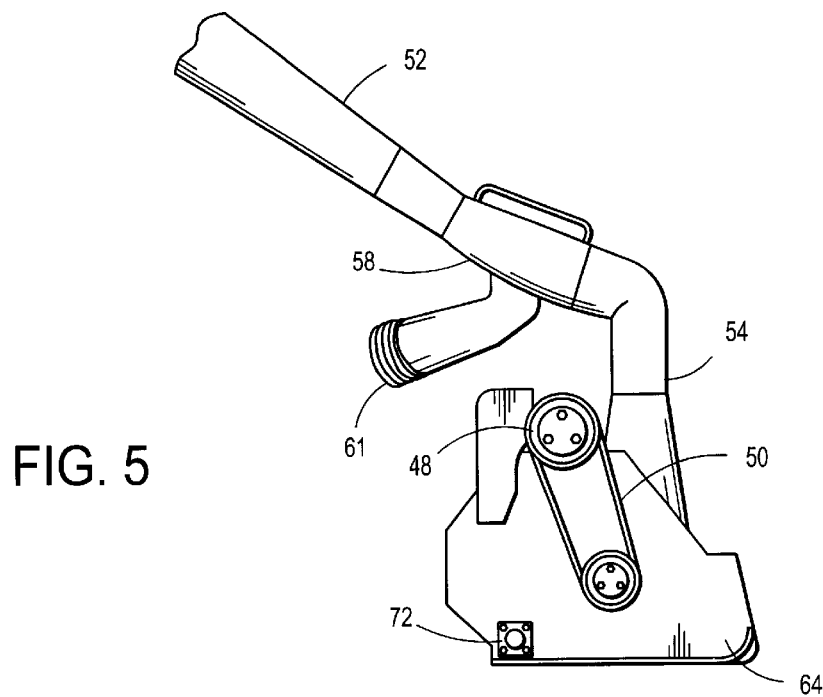
FIG. 5 is a detailed view of the air ducting, venturi and drive mechanism for the flail rotor.

Referring now specifically to the drawings, FIG. 1 shows the disclosed self-propelled flail mower and vacuum 10, the major components comprising a drive vehicle 12 having a frame 14, an engine 16, a front 18, driver compartment 19, a back 20, drive wheels 22, rear wheels 24 a cuttings basket 26 attached to the drive vehicle 12, and a flail mower housing 28 pivotally attached to the front 18 of the drive vehicle 12. A flail rotor assembly 30 is mounted within the flail mower housing 28. Bearing means such as rotor bearings 32 support the rotor assembly 30 within the housing 28. The flail rotor assembly 30 comprises a rotor 34, a plurality of vanes 36 and a plurality of flail blades 38. The vanes 36 and blades 38 are attached to the rotor 34. Coupling means, such as a plurality of transfer cases, connect the engine 16 to the flail rotor assembly 30, providing a drive mechanism for the rotor assembly. As will be appreciated by those skilled in the art, a number of different drive train assemblies may be used for driving the rotor assembly and supplying power to the different components of the invention. FIG. 4 provides a schematic of one such drive train. In the embodiment shown in FIG. 4, the coupling means connecting the flail rotor assembly 30 to the engine 16 comprises a first transfer case 40, a second transfer case 42, a centrifugal clutch 44, a right angle drive 46, drive pulley 48, and drive belts 50. Acceptable transfer cases are available through NEW PROCESS.

As shown in FIG. 4, in addition to the mechanical linkage connecting the engine 16 to the rotor assembly 30, for this embodiment of the drive train, the engine also drives two hydraulic pumps, a first hydraulic pump 51 and a second hydraulic pump 53 which respectively provide power fluid for: (1) the hydraulic rams which rotate or pivot the cuttings basket 26 and which pivot, i.e., raise and lower, the flail mower housing 28; and (2) power fluid for hydraulic motors on the drive wheels 22.

The self-propelled flail mower and vacuum 10 further comprises discharge chutes 52 having an intake end 54 and a discharge end 56. The intake end 54 is connected to the flail mower housing 28 and the discharge end 56 is connected to the cuttings basket 26. When the rotor 34 is rotated at high rpm, the vanes 36 and the blades 38 provide positive pressure into the intake end 54 of the discharge chute 52, propelling cuttings from the flail mower housing 28 into the discharge chute 52 and out the discharge end 56 into the cuttings basket 26.

A blower 60 may be connected to the discharge chutes 52 to provide additional energy for propelling the cuttings through the discharge chutes 52 into the cuttings basket 26. An air boost inlet 58 is fabricated into the discharge chutes 52 to allow attachment of duct works 61, which connect blower 60 to the discharge chutes 52. Duct works 61 may terminate in nozzle 74, which is inserted through air boost inlet 58. Air boost inlet 58 is simply an opening fabricated in discharge chute 52 adapted to receive and seal around nozzle 74. The blower 60 may be run as an auxiliary unit off power means such as engine 16, as shown schematically in FIG. 4, or other power means known in the art.

A suitable drive vehicle 12 may be obtained by modifying a JOHN DEERE cotton picker, Model No. 9900 or similar picking machine. The drive vehicle 12 of the present device may use substantially the same frame 14, engine 16, operator compartment 19, cuttings basket 26 and blower 60 as the Model No. 9900. The discharge chutes 52 of the present device may be fabricated from cotton ducts existing on the Model No. 9900 or similar machine. The cuttings basket 26 of the present invention is pivotally attached to the drive vehicle 12, or, more specifically, to the frame 14 of the drive vehicle 12, allowing the cuttings basket 26 to be emptied by lifting and pivoting the basket 26 with hydraulic rams or other actuating means.

The present drive vehicle 12 also has a number of distinctions from the Model No. 9900. As described above, the drive train of the present device 10 is substantially different from the drive train of the Model No. 9900 or similar machine. In addition, the drive wheels 22 are wider to provide a large footprint, i.e. better floatation, on the grass to minimize crushing or other damage to the turf as it is being mowed. The drive wheels 22 have been extended outward from those of the Model No. 9900 to accommodate the increased width. A pair of rear wheels 24 of the disclosed device provide steering for the unit, as compared to a single rear wheel used on the Model No. 9900. The flail mower housing 28 and its components are also novel additions to the Model No. 9900.

Figure 2:
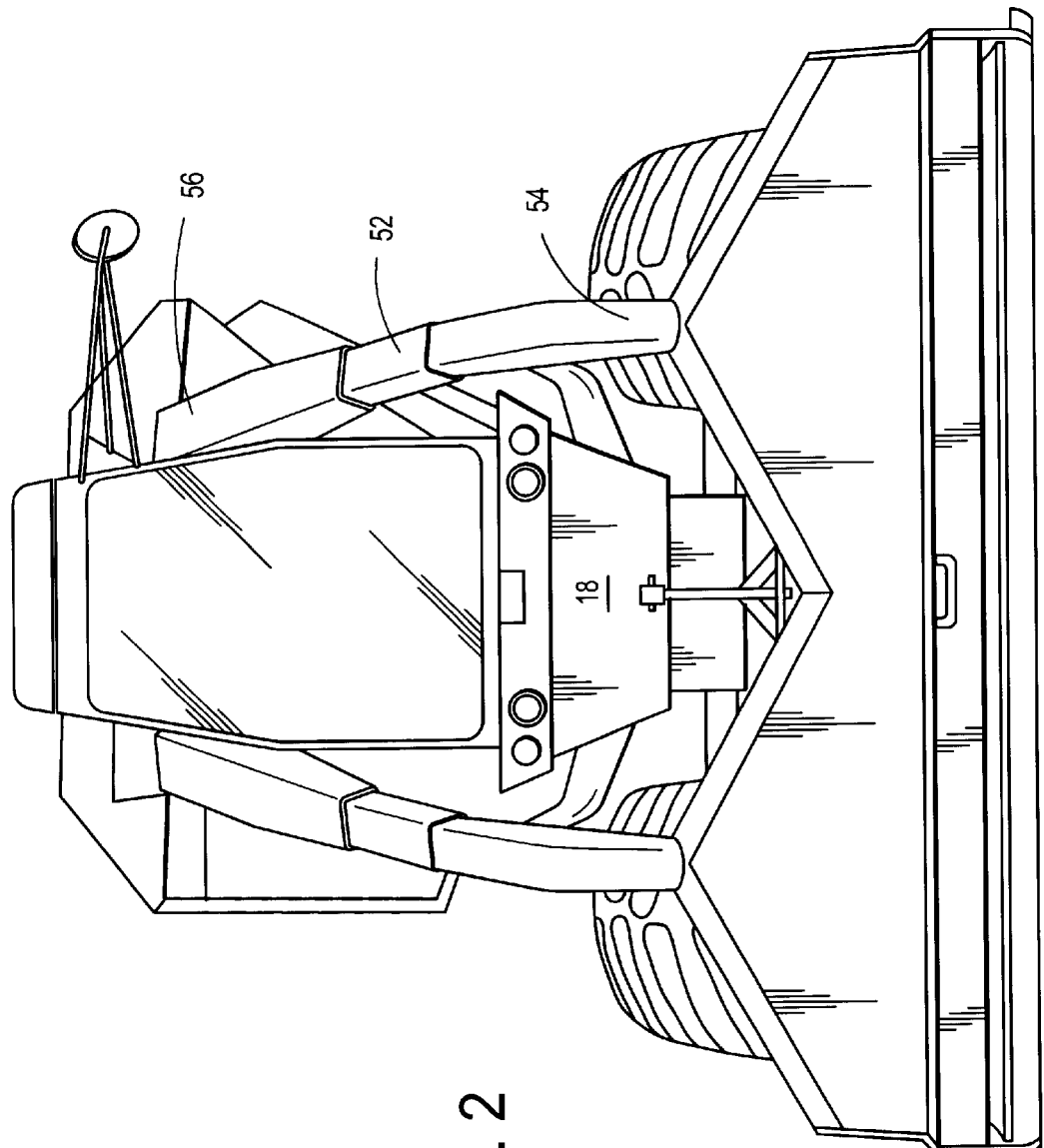
FIG. 2 is a front view of the disclosed device.
Figure 3:
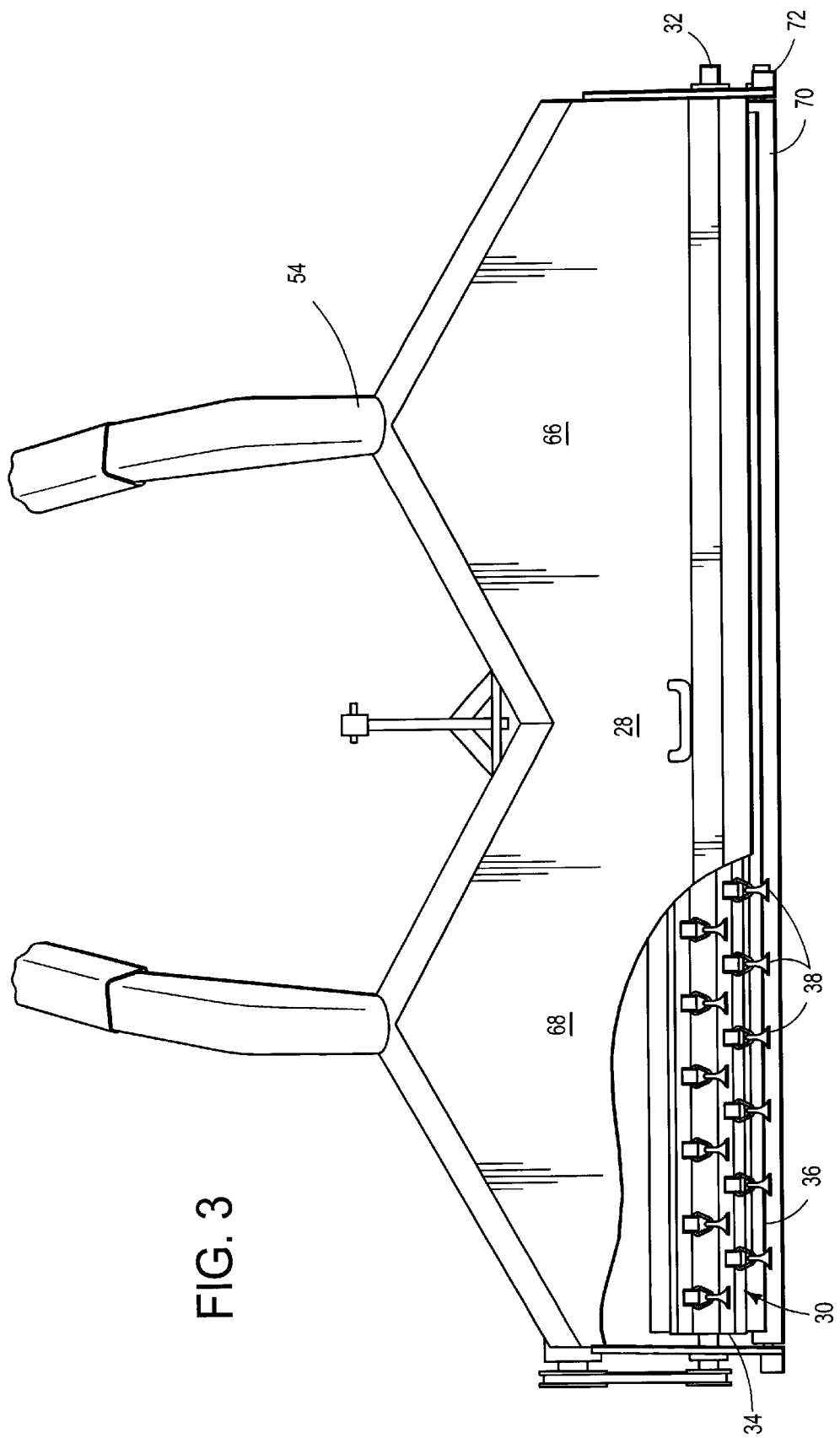
FIG. 3 is a front cut-away view of the flail blades mounted on the rotor, and the flail mower housing.

The flail mower housing 28 comprises, among other components, the flail rotor assembly 30. The flail mower housing 28 further comprises a left side plate 62 bounding the left side of the housing 28, a right side plate 64 bounding the right side of the housing 28, a left plenum chamber 66, a right plenum chamber 68, roller 70, roller bearings 72, and a scavenger plate, not shown, which is installed above, to the rear and parallel to the axis of the rotor 34. The flail blades 38, when new, should have at least ⅛ inch clearance below the scavenger plate. As shown in FIGS. 1 through 3, the left plenum chamber 66 and the right plenum chamber 68 are funnel-shaped for gathering the cuttings into the intake end 54 of discharge chute 52, where intake end 54 is connected to the top of each plenum chamber. Alternatively, it is easily appreciated that a single funnel-shaped plenum chamber (or a plurality of plenum chambers) might be used instead of the left plenum chamber 66 and the right plenum chambers 68 depicted in the figures herein.

The flail rotor assembly 30 may incorporate certain components of flail mowers manufactured by VERISMO, TRI-CORP or ALAMO. The flail rotor assembly 30 of the present invention 10 comprises a rotor 34, a plurality of vanes 36 and a plurality of flail blades 38, the vanes 36 and blades 38 attached to the rotor 34. Rotor bearings 32 mounted to the left side plate 62 and right side plate 64 support the rotor assembly 30 within the housing 28. Similarly, roller 70 is supported by roller bearings 72, the roller bearings mounted to the left side plate 62 and the right side plate 64 of the housing 28. The rotor 34, rotor bearings 32, flail blades 38, left side plate 62, right side plate 64, roller 70 and roller bearings 72 of the present device may be obtained from a VERISMO flail blade mower. However, the vanes 36, the left plenum chamber 66, the right plenum chamber 68, and scavenger plate are additional components which are not present in the VERISMO or similar flail mower.

Figure 6:
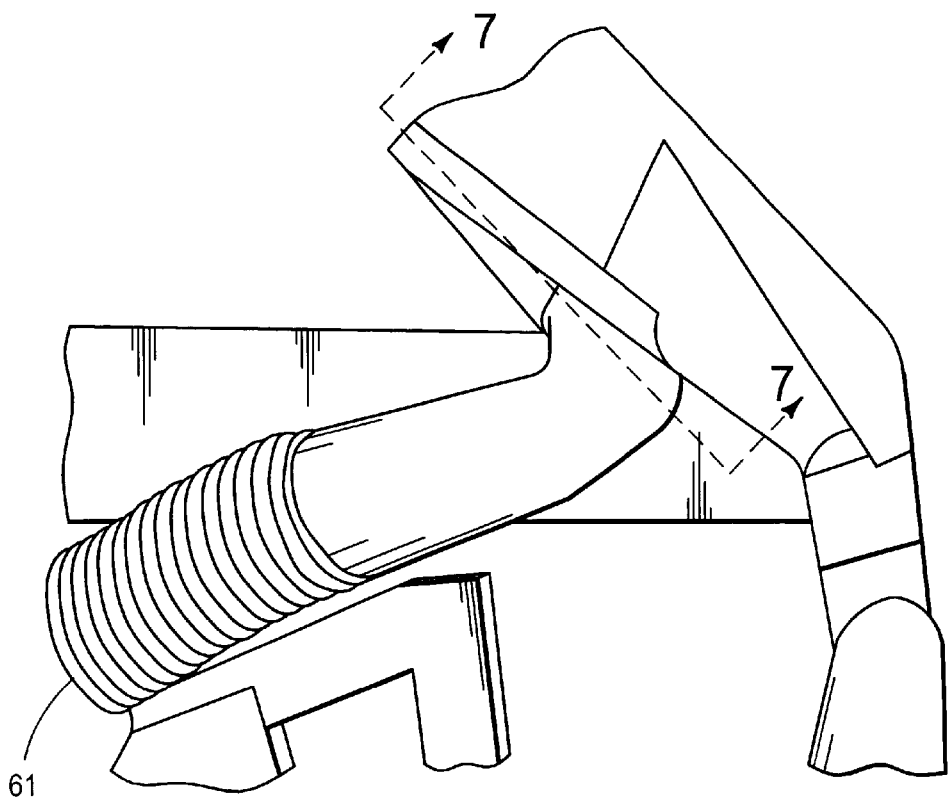
FIG. 6 is a detailed view showing the air ducting and venturi.
Figure 7:
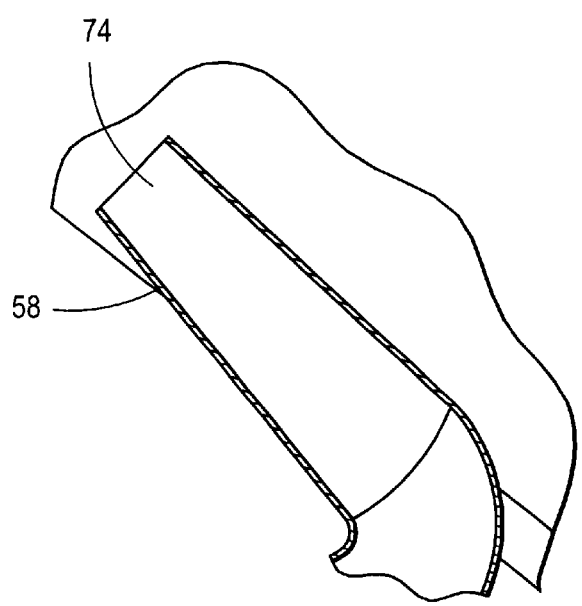
FIG. 7 is a sectional view along line 6—6.
Figure 8:
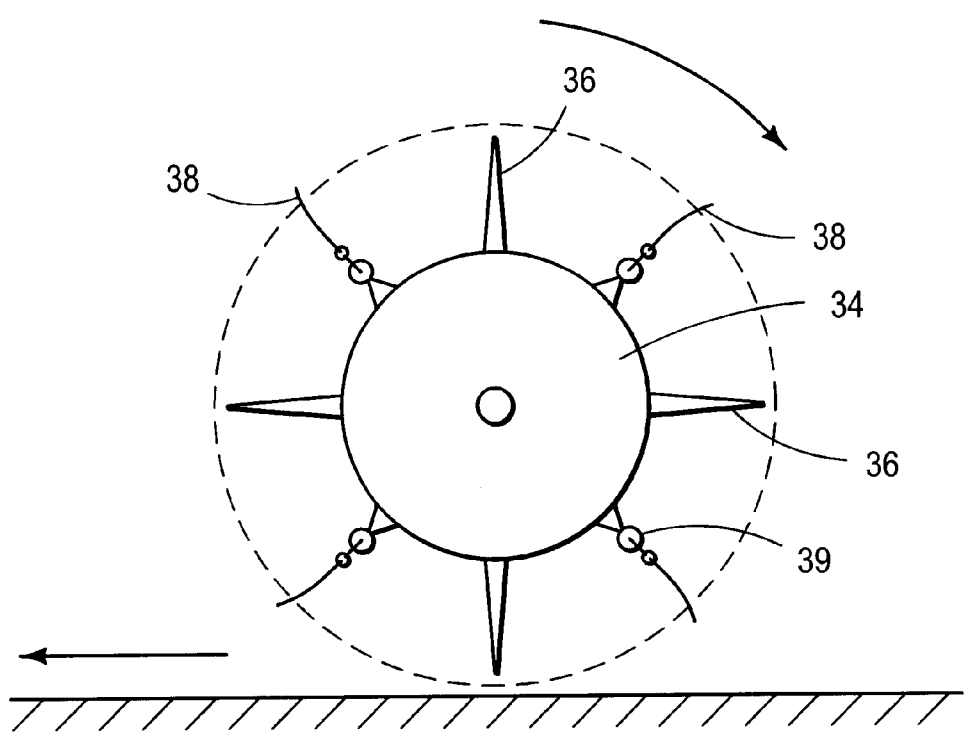
FIG. 8 is a schematic showing the direction of rotation of the rotor, blades, and vanes with respect to the direction of motion of the drive vehicle.

The blades 38, also referred to as flailing blades, scoop blades or cup knives, are pivotally attached with links 39 to the rotor 34. Acceptable blades are manufactured by VANDL MANUFACTURING. The vanes 36, which radiate outwardly from the rotor 34, and the blades 38 create a vacuum effect which allows the present device to collect grass cuttings as they are being mowed. The vacuuming is assisted by the Venturi effect created by nozzle 74 at the air boost inlet 58 when blower 60 is activated. FIG. 6 shows a detailed view of nozzle throat 74 inserted through air boost inlet 58. It has been found that rotor 34 should spin at approximately 1600 to 1700 rpm to prevent leaving cuttings on the turf. As shown in FIG. 8, the direction of rotation of rotor 34 is clockwise with respect to the normal direction of travel of the drive vehicle 12.

While the above is a description of various embodiments of the present invention, further modifications may be employed without departing from the spirit and scope of the present invention. For example, the size, shape, position and/or material of the various components may be changed as desired. Thus the scope of the invention should not be limited by the specific structures disclosed. Instead the true scope of the invention should be determined by the following claims.

What is claimed is:

1. A self-propelled flail mower and vacuum comprising:
   (a) a drive vehicle having a frame, an operator compartment supported by the frame, a front and a back, wheels operably attached to the vehicle, an engine, and a cuttings basket attached to the drive vehicle;
   (b) a flail mower housing pivotally attached to the front of the drive vehicle;
   (c) a flail rotor assembly mounted within the housing, the flail rotor assembly comprising a rotor, a plurality of vanes attached to the rotor and a plurality of flail blades pivotally attached to the rotor;
   (d) bearing means for supporting the rotor assembly within the housing;
   (e) coupling means connecting the engine to the flail rotor assembly;
   (f) a discharge chute having an intake end, a discharge end, the discharge chute further comprising an air boost inlet located between the intake end and discharge end, the intake end connected to the flail mower housing and the discharge end connected to the cutting basket;
   (g) a blower;
   (h) power means for operating the blower, wherein the power means for the blower is the engine; and
   (i) duct works connecting the blower to the air boost inlet wherein the duct works terminate at the air boost inlet with a nozzle, and a venturi is formed within the nozzle.

2. A self-propelled flail mower and vacuum comprising:
   (a) a drive vehicle having a frame, an operator compartment supported by the frame, a front and a back, the front and back defining a longitudinal axis, wheels operably attached to the vehicle, an engine attached to the frame, and a cuttings basket attached to the drive vehicle, the drive vehicle adapted for self-propelled motion in a direction parallel to the longitudinal axis;
   (b) a flail mower housing pivotally attached to the front of the drive vehicle, the flail mower housing mounted transversely to the longitudinal axis, the flail mower housing having a left side plate and a right side plate, and the flail mower housing further defining a left plenum chamber and a right plenum chamber;
   (c) a flail rotor assembly mounted within the housing, the flail rotor assembly comprising a rotor, a plurality of vanes attached to the rotor and a plurality of flail blades pivotally attached to the rotor;
   (d) bearings attached to the left side plate and bearings attached to the right side plate, said bearings supporting the rotor assembly within the housing;
   (e) coupling means connecting the engine to the flail rotor assembly;
   (f) a first discharge chute having an intake end and a discharge end, the first discharge chute further comprising an air boost inlet located between the intake end and discharge end, the intake end connected to the left plenum chamber and the discharge end connected to the cutting basket;
   (g) a second discharge chute having an intake end and a discharge end, the second discharge chute further comprising an air boost inlet located between the intake end and discharge end, the intake end connected to the right plenum chamber and the discharge end connected to the cutting basket;
   (h) duct works connecting a blower to the air boost inlets of the discharge chutes wherein the duct works terminate at each air boost inlet with a nozzle; and
   (i) power means for operating the blower, wherein the power means for the blower is the engine.

3. The self-propelled flail mower of claim 2 wherein a venturi is formed within each nozzle.

* * * * *